US008710905B2

(12) United States Patent
Chen (10) Patent No.: US 8,710,905 B2
(45) Date of Patent: Apr. 29, 2014

(54) BIAS VOLTAGE GENERATING CIRCUIT AND SWITCHING POWER SUPPLY THEREOF

(71) Applicant: Silergy Semiconductor Technology (Hangzhou) Ltd, Hangzhou (CN)

(72) Inventor: Wei Chen, Saratoga, CA (US)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

(21) Appl. No.: 13/958,761

(22) Filed: Aug. 5, 2013

(65) Prior Publication Data

US 2014/0077867 A1 Mar. 20, 2014

(30) Foreign Application Priority Data

Sep. 14, 2012 (CN) .......................... 2012 1 0341512

(51) Int. Cl.
*H02M 7/00* (2006.01)
(52) U.S. Cl.
USPC ........... 327/531; 327/540; 327/427; 323/284; 323/288
(58) Field of Classification Search
USPC ............. 327/535, 531, 532, 538, 540, 84, 86, 327/423, 424, 427, 430, 434, 494; 323/284, 323/288, 290, 305, 311, 355, 363
See application file for complete search history.

(56) References Cited

U.S. PATENT DOCUMENTS 5,349,284 A * 9/1994 Whittle .......................... 323/207
6,686,725 B1 * 2/2004 Choi et al. ..................... 323/207

* cited by examiner

*Primary Examiner* — Lincoln Donovan
*Assistant Examiner* — Jung H Kim
(74) *Attorney, Agent, or Firm* — Michael C. Stephens, Jr.

(57) ABSTRACT

Disclosed herein are bias voltage generating circuits configured for switching power supplies, and associated control methods. In one embodiment, a bias voltage generating circuit can include: (i) a first control circuit configured to compare a drain-source voltage of a switch against a bias voltage; (ii) a capacitor, with the bias voltage across the capacitor; (iii) a second control circuit configured to control the switch, and that is enabled when the bias voltage is at least as high as an expected bias voltage; (iv) the first control circuit being configured to control the capacitor to charge when the drain-source voltage of the switch is greater than the bias voltage; and (v) the bias voltage being less than an overvoltage protection voltage when the capacitor charges, and where the overvoltage protection voltage comprises a voltage that is a predetermined amount higher than the expected bias voltage.

4 Claims, 6 Drawing Sheets

BIAS VOLTAGE GENERATING CIRCUIT AND SWITCHING POWER SUPPLY THEREOF

RELATED APPLICATIONS

This application claims the benefit of Chinese Patent Application No. 201210341512.5, filed on Sep. 14, 2012, which is incorporated herein by reference in its entirety.

FIELD OF THE INVENTION

The present invention relates to the field of power electronics, and more specifically to a bias voltage generating circuit for a switching power supply.

BACKGROUND

With rapid development in electronic applications, switching power supplies are widely utilized in various fields, such as computers, electrical equipment, instrumentation, light-emitting diodes (LEDs), medical devices, military equipment and so on. Generally speaking, a switching power supply can be configured to convert an external AC power supply to a relatively stable DC power supply that can be used for a load.

SUMMARY

In one embodiment, a bias voltage generating circuit can include: (i) a first control circuit configured to compare a drain-source voltage of a first switch against a bias voltage; (ii) a first capacitor, where the bias voltage is across the first capacitor; (iii) a second control circuit configured to control the first switch, where the second control circuit is configured to be enabled when the bias voltage is at least as high as an expected bias voltage; (iv) where the first control circuit is configured to control the first capacitor to charge when the drain-source voltage of the first switch is greater than the bias voltage; and (v) where the bias voltage is less than an overvoltage protection voltage when the first capacitor charges, and where the overvoltage protection voltage comprises a voltage that is a predetermined amount higher than the expected bias voltage.

In one embodiment, a switching power supply can include such a bias voltage generating circuit. The switching power supply can also include: (i) a power stage circuit coupled to the bias voltage generating circuit, where the bias voltage generating circuit is configured to generate the bias voltage; and (ii) where the second control circuit is configured to receive the bias voltage, and to regulate the switching power supply to output a DC signal for a load by controlling a switching operation of the first switch.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching power supply can be configured to convert an external AC power (e.g., commercial power 220V, 380V, etc.) to a stable DC power (e.g., +5V, −5V, +12V, −12V, etc.) for a load. For example, a switching power supply can include a power stage circuit, a control circuit, and a bias voltage circuit that is used to supply power for the control circuit. The control circuit may operate after receiving a suitable bias voltage, and can control a switching operation of a switch in the power stage circuit. In this way, the power stage circuit can be utilized to generate a relatively stable output voltage.

A power stage circuit can include a magnetic element (e.g., a transformer), and the bias voltage can be coupled to the magnetic element through an auxiliary winding to obtain the bias voltage. However, such an auxiliary winding may increase circuit area and power losses. In addition, the control circuit can also be powered by utilizing a separate power supply, such as a linear regulator low-dropout (LDO) regulator. An LDO regulator is a DC linear voltage regulator that can operate with a very small input-output differential voltage. However, such a separate power supply may increase overall circuit cost and volume, and may lower conversion efficiency.

In particular embodiments, a high-efficiency and low-cost bias voltage can be utilized to meet control circuit power considerations, and to further ensure stability of an output signal. A bias voltage generating circuit in certain embodiments may have a relatively simple structure, relatively low costs, and high efficiency, as compared to conventional approaches.

In one embodiment, a bias voltage generating circuit can include: (i) a first control circuit configured to compare a drain-source voltage of a first switch against a bias voltage; (ii) a first capacitor, where the bias voltage is across the first capacitor; (iii) a second control circuit configured to control the first switch, where the second control circuit is configured to be enabled when the bias voltage is at least as high as an expected bias voltage; (iv) where the first control circuit is configured to control the first capacitor to charge when the drain-source voltage of the first switch is greater than the bias voltage; and (v) where the bias voltage is less than an overvoltage protection voltage when the first capacitor charges, and where the overvoltage protection voltage comprises a voltage that is a predetermined amount higher than the expected bias voltage.

In one embodiment, a switching power supply can include such a bias voltage generating circuit. The switching power supply can also include: (i) a power stage circuit coupled to the bias voltage generating circuit, where the bias voltage generating circuit is configured to generate the bias voltage; and (ii) where the second control circuit is configured to receive the bias voltage, and to regulate the switching power supply to output a DC signal for a load by controlling a switching operation of the first switch.

Figure 1:
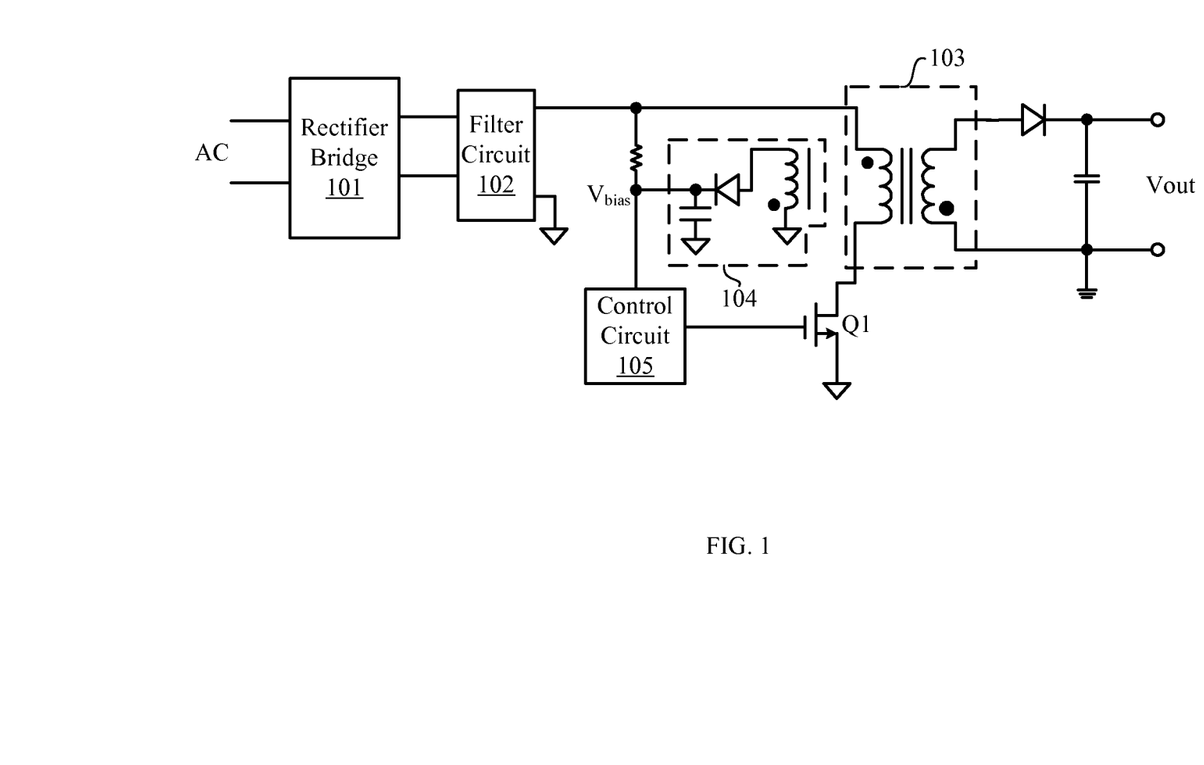
FIG. 1 shows a schematic block diagram of an example switching power supply.

Referring now to FIG. 1, shown is a schematic block diagram of an example switching power supply. In this particular example, the power stage circuit may include a single-stage flyback converter. The switching power supply can include rectifier bridge 101, filter circuit 102, transformer 103, bias voltage circuit 104, control circuit 105, and switch Q1. After being processed by rectifier bridge 101 and filter circuit 102, an external alternating current AC can be transferred to the dotted terminal of the primary side of transformer 103. The non-dotted terminal of the primary side of transformer 103 can be coupled to ground through switch Q1.

Bias voltage circuit 104 can supply power for control circuit 105 such that control circuit 105 can generate a control signal to control switch Q1. In this way a stable DC signal for a load can be generated through the secondary side of transformer 103 at Vout. Here, bias voltage circuit 104 in the switching power supply can obtain energy through the auxiliary winding that is coupled to the primary winding of transformer 103. The electrical energy can be stored in a capacitor in bias voltage circuit 104. A voltage across the capacitor can be configured as a bias voltage of control circuit 105. However, the circuit volume of the auxiliary winding and the power losses can be relatively high in this approach. In particular embodiments, a bias voltage generating circuit that can include a control circuit and a capacitor, where a bias voltage can be obtained by controlling the charging operation of the capacitor through the control circuit.

Figure 2:
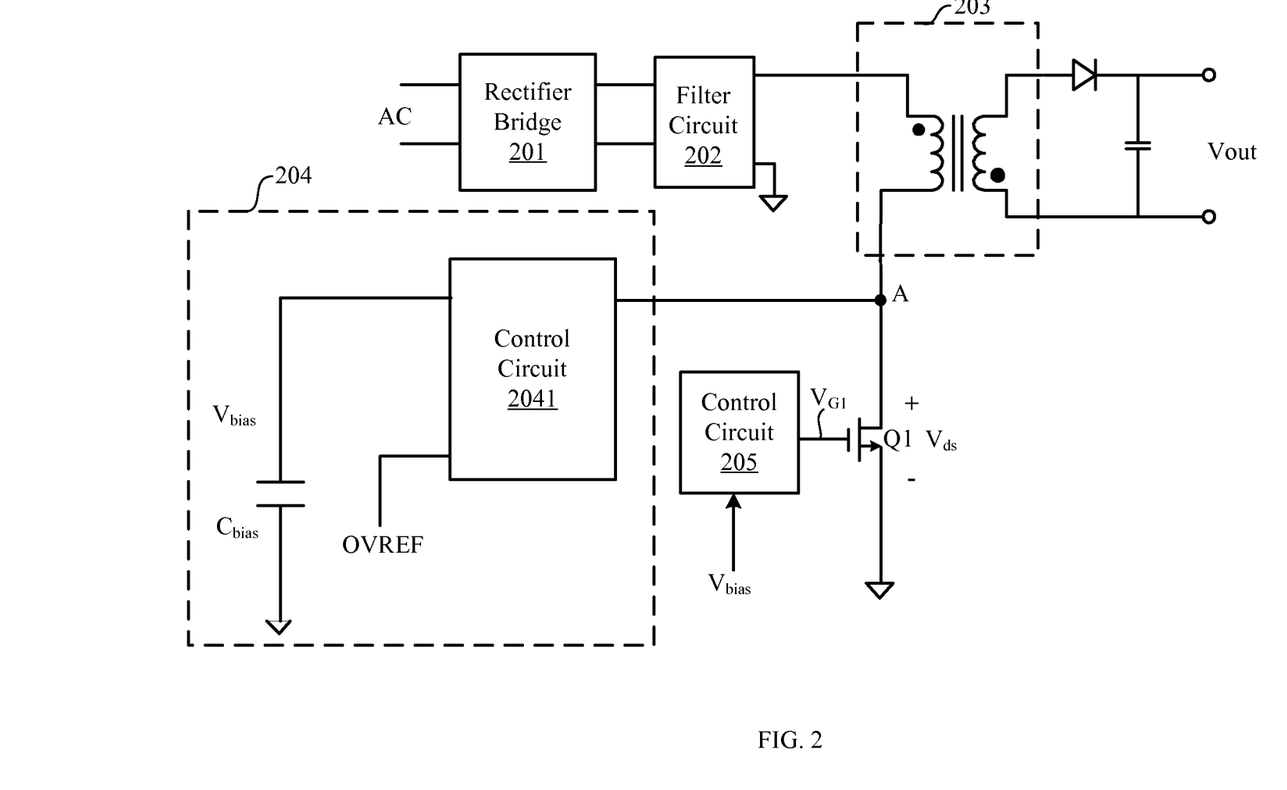
FIG. 2 shows a schematic block diagram of a first example bias voltage generating circuit in accordance with embodiments of the present invention.

Referring now to FIG. 2, shown is a schematic block diagram a first example bias voltage generating circuit applied in a switching power supply, in accordance with embodiments of the present invention. In this particular example, a power stage circuit can include a single-stage flyback transformer circuit; however, other power stage circuit configurations can also be utilized in certain embodiments. In this example, the switching power supply can include rectifier bridge 201, filter circuit 202, transformer 203, control circuit 205 and switch Q1. Bias voltage generating circuit 204 can include control circuit 2041, and capacitor $C_{bias}$.

In the drawings, same or similar structures may be represented by similar element numbers, but with, e.g., a '2' replacing a '1,' and so forth, corresponding to other figure numbers. Thus, rectifier bridge 201 may be the same or substantially similar to rectifier bridge 101 discussed above. Similarly, filter circuit 202 maybe the same or substantially similar to filter circuit 102 discussed above, and so forth.

Control circuit 2041 can connect to a common node (e.g., node A in FIG. 2) of a magnetic element (e.g., the primary winding of transformer 203) in the power stage circuit. Also, switch Q1 can receive electrical energy or current from the power stage circuit. Control circuit 2041 can also be coupled to capacitor $C_{bias}$, as shown. Control circuit 2041 can compare a drain-source voltage ($V_{ds}$) of switch Q1 against a voltage ($V_{bias}$) across capacitor $C_{bias}$. When the drain-source voltage of switch Q1 is greater than the voltage across capacitor $C_{bias}$, control circuit 2041 can allow capacitor $C_{bias}$ to charge. In addition, when the drain-source voltage of switch Q1 is larger than the voltage across capacitor $C_{bias}$, but smaller than overvoltage protection voltage OVREF, control circuit 2041 can control capacitor $C_{bias}$ to charge or operate in a charging state. Further, during the charging process, control circuit 2041 can make or maintain the voltage across capacitor $C_{bias}$ as smaller than overvoltage protection voltage OVREF. The voltage across capacitor $C_{bias}$ can be provided to control circuit 205 as bias voltage $V_{bias}$.

It should be noted that in this particular example, overvoltage protection voltage OVREF can be configured to be no less than (or at least as high as) an expected bias voltage of the control circuit. For example, the overvoltage protection voltage OVREF can be in a range of from about 0% to about 20% greater than the expected bias voltage. Overvoltage protection voltage OVREF may be chosen and set according to specific circuit implementations. In some cases, OVREF can be user programmable and/or may be overridden (e.g., during test or characterization).

In this example, bias voltage generating circuit 204 can use control circuit 2041 to generate bias voltage $V_{bias}$, such as to enable control circuit 205 by controlling capacitor $C_{bias}$ to operate in a charging state. For example, control circuit 205 may be enabled or otherwise allowed to function when $V_{bias}$ is greater than or equal to an expected or predetermined bias voltage. This approach may be independent of, or may not otherwise utilise, auxiliary windings or separate voltage sources, as discussed relative to the implementations discussed above. In this way, a substantially stable output signal can be provided. Also, without high-loss components, the circuit structure of particular embodiments can be relatively simple, product costs can be relatively low, and the conversion efficiency of the converter can be relatively high.

Figure 3:
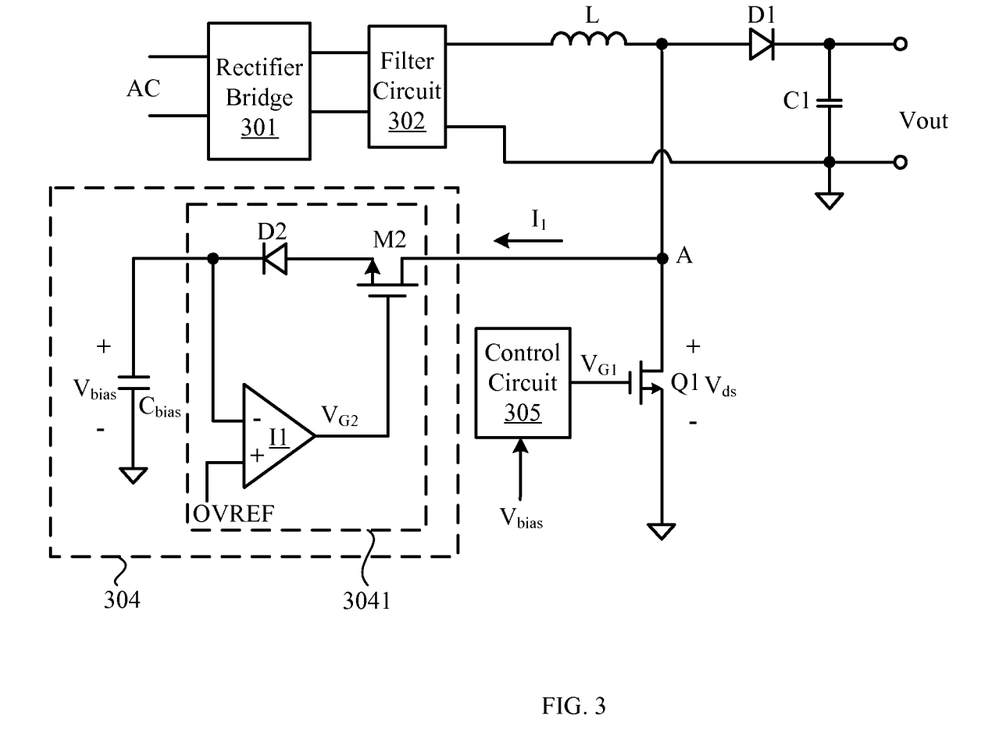
FIG. 3 shows a schematic block diagram of a second example bias voltage generating circuit in accordance with embodiments of the present invention.

Referring now to FIG. 3, shown is a schematic block diagram of an example bias voltage generating circuit in accordance with embodiment of the present invention. In this example, the power stage circuit can include a buck topology; however, other power stage circuit configurations can also be utilized in certain embodiments. In this example, the switching power supply can include rectifier bridge 301, filter circuit 302, inductor L, diode D1, output capacitor C1, bias voltage generating circuit 204, control circuit 305, and switch Q1. In this example, bias voltage generating circuit 304 can include control circuit 3041 and capacitor $C_{bias}$. Control circuit 3041 can include comparator I1, switch M2, and diode D2. Comparator I1 may have an inverting input terminal to receive bias voltage $V_{bias}$, and a non-inverting input terminal to receive overvoltage protection voltage OVREF. An output signal of the first comparator I1 can be configured as control signal $V_{G2}$.

For example, switch M2 can be configured as a J-FET transistor M2, which can connect in series to diode D2. The drain of J-FET transistor M2 can connect to a common node (e.g., node A) of inductor L and the drain of switch Q1 in the power stage circuit. The source of transistor M2 can connect to the anode of diode D2, and the control terminal (e.g., gate) of transistor M2 can be coupled to an output terminal of comparator I1 (e.g., control signal $V_{G2}$). The cathode of diode D2 can be coupled to one end of capacitor $C_{bias}$, and the other end of capacitor $C_{bias}$ can be coupled to ground. When J-FET transistor M2 is conductive, current $I_1$ of the power stage circuit may charge capacitor $C_{bias}$ through diode D2. Further, switch M2 in this particular example can be a depletion-type component, such as a J-FET transistor or any other depletion-type transistors. However, other types of transistors can also be employed for switch M2.

Example operation of bias voltage generating circuit 304 in this particular arrangement will now be described. Initially, switch M2 may be on (in a conductive state) in because switch M2 may be a normally-on type switching component. When drain-source voltage $V_{ds}$ of switch Q1 becomes larger/greater than bias voltage $V_{bias}$, diode D2 can be turned on, and current $I_1$ in the power stage circuit may charge capacitor $C_{bias}$ through J-FET transistor M2 and diode D2. In this way, bias voltage $V_{bias}$ may gradually increase. In this particular example, drain-source voltage $V_{ds}$ may change as a sine wave due to resonance between inductor L and a parasitic capacitor of switch Q1.

Along with the variation of drain-source voltage $V_{ds}$ (similar to the sine wave), when drain-source voltage $V_{ds}$ of switch Q1 is smaller/less than bias voltage $V_{bias}$, diode D2 can be turned off and capacitor $C_{bias}$ may stop charging. By this process, when the voltage across the capacitor (e.g., bias voltage $V_{bias}$) reaches a voltage level target (e.g., an expected bias voltage) of control circuit 305, control circuit 305 can begin operation, or otherwise be enabled. Thereafter, when bias voltage $V_{bias}$ is charged to overvoltage protection voltage OVREF, the output signal of comparator I1 ($V_{G2}$) can go low. Also, since the gate-source voltage of J-FET transistor M2 can be negative and may reach a pinch-off voltage of J-FET transistor M2, J-FET transistor M2 can turn off and capacitor $C_{bias}$ may stop charging.

In this way, the overvoltage protection function can be obtained so as to prevent damaging the circuit due to excessive charging of capacitor $C_{bias}$. Thus, the bias voltage generating circuit in particular embodiments can control a charging process of a capacitor to generate a bias voltage that powers a control circuit by controlling conduction of switch M2 and diode D2, with a relatively simple circuit structure, relatively low product costs, and relatively high conversion efficiency.

Figure 4:
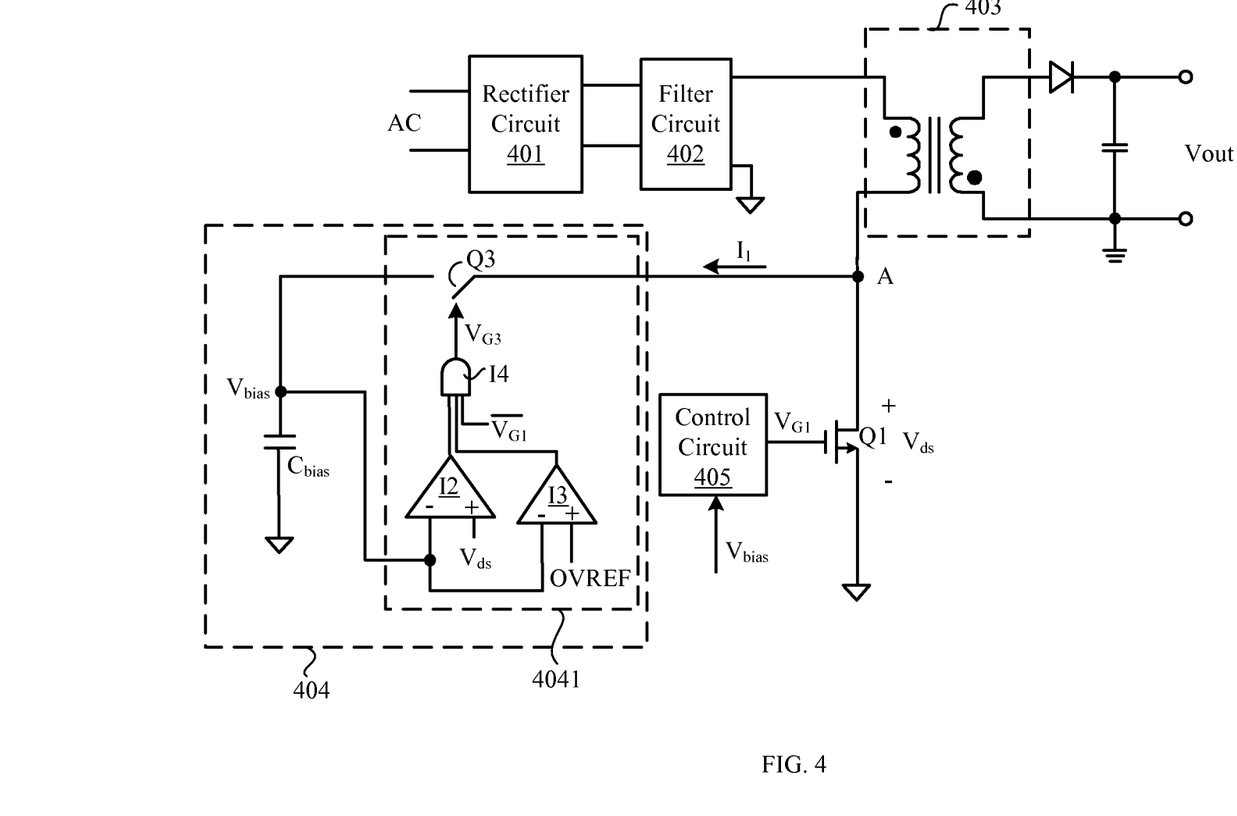
FIG. 4 shows a schematic block diagram of a third example bias voltage generating circuit in accordance with embodiments of the present invention.

Referring now to FIG. 4, shown is a schematic block diagram of a bias voltage generating circuit in accordance with embodiments of the present invention. In this example, a power stage circuit can include a single-stage flyback transformer circuit; however, other power stage circuit configurations can also be utilized in certain embodiments. In this example, the switching power supply can include rectifier bridge 401, filter circuit 402, transformer 403, control circuit 405, and switch Q1. Bias voltage generating circuit 404 can include control circuit 4041, and capacitor $C_{bias}$. Also, control circuit 4041 can include comparator I2, comparator I3, AND-gate I4, and switch Q3.

In control circuit 4041, an inverting input terminal of comparator I2 can connect to one end of capacitor $C_{bias}$ to receive bias voltage $V_{bias}$, and a non-inverting input terminal can receive drain-source voltage $V_{ds}$ of switch Q1, which can be sampled from the drain and source of switch Q1. An inverting input terminal of comparator I3 can receive bias voltage $V_{bias}$, and a non-inverting input terminal of comparator I3 can receive overvoltage protection voltage OVREF. AND-gate I4 can receive output signals of comparators I2 and I3, as well as an inverted version of control signal $V_{G1}$ of switch Q1. An output terminal of AND-gate I4 can output control signal $V_{G3}$, and a control terminal of switch Q3 can receive control signal $V_{G3}$. A first terminal of switch Q3 can connect to a common node (e.g., node A) of the primary winding of transformer 403 and switch Q1. A second terminal of switch Q3 can connect to capacitor $C_{bias}$. For example, switch Q3 can be a switch that may be on at a low level of control signal $V_{G3}$ and off at a high level of control signal $V_{G3}$.

Example operation of the bias voltage generating circuit shown in FIG. 4 will now be described. Initially, control circuit 405 may not be operating, and control signal $V_{G1}$ of switch Q1 may be at a low level. Also, switch Q1 can be turned off and the inverted version of $V_{G1}$ can be at high level. Due to resonance between the primary winding of transformer 403 and parasitic capacitance of switch Q1, drain-source voltage $V_{ds}$ of switch Q1 may change in a way similar to sine-wave. When drain-source voltage $V_{ds}$ of switch Q1 reaches a level of bias voltage $V_{bias}$, comparator I2 can output a high level to AND-gate I4. Because bias voltage $V_{bias}$ may be less than overvoltage protection voltage OVREF, the output of comparator I3 can be high. Therefore, AND-gate I4 may output a high level (e.g., control signal $V_{G3}$ can be high).

Control signal $V_{G3}$ can turn on switch Q3, and current $I_1$ in the power stage circuit may charge capacitor $C_{bias}$ through switch Q3. Thus, bias voltage $V_{bias}$ may gradually increase. Thereafter, along with the variation of drain-source voltage $V_{ds}$ of switch Q1 (similar to sine-wave), when drain-source voltage $V_{ds}$ is less than bias voltage $V_{bias}$, an output of comparator I2 can go low, and control signal $V_{G3}$ may also go low to turn off switch Q3. This process may repeat until bias voltage $V_{bias}$ of capacitor $C_{bias}$ is charged to power control circuit 405. Then, the control circuit 405 may begin operation. In addition, in the above charging process, when bias voltage $V_{bias}$ is charged to overvoltage protection voltage OVREF, the output signal of comparator I3 may go low. This can control switch Q3 to turn off according to signal $V_{G3}$ of AND-gate I4. In this way, possible circuit damage caused by excessively charging bias voltage $V_{bias}$ to overvoltage protection voltage OVREF can be prevented.

In order to prevent discharge of capacitor $C_{bias}$ directly to ground, the inverted version of control signal $V_{G1}$ input to AND-gate I4 can ensure that switches Q1 and Q3 are not simultaneously turned on. In particular embodiments, a bias voltage generating circuit can control a charging process of a capacitor to generate a bias voltage that can provide control circuit power, or otherwise enable a control circuit (e.g., 405) by controlling the switching operation of a switch (e.g., Q3). A bias voltage generating circuit of particular embodiments may also have an overvoltage protection function. In addition, the circuit structure of particular embodiments can be relatively simple, cost-effective, and with relatively high conversion efficiency, without auxiliary windings or independent power supplies.

Figure 5:
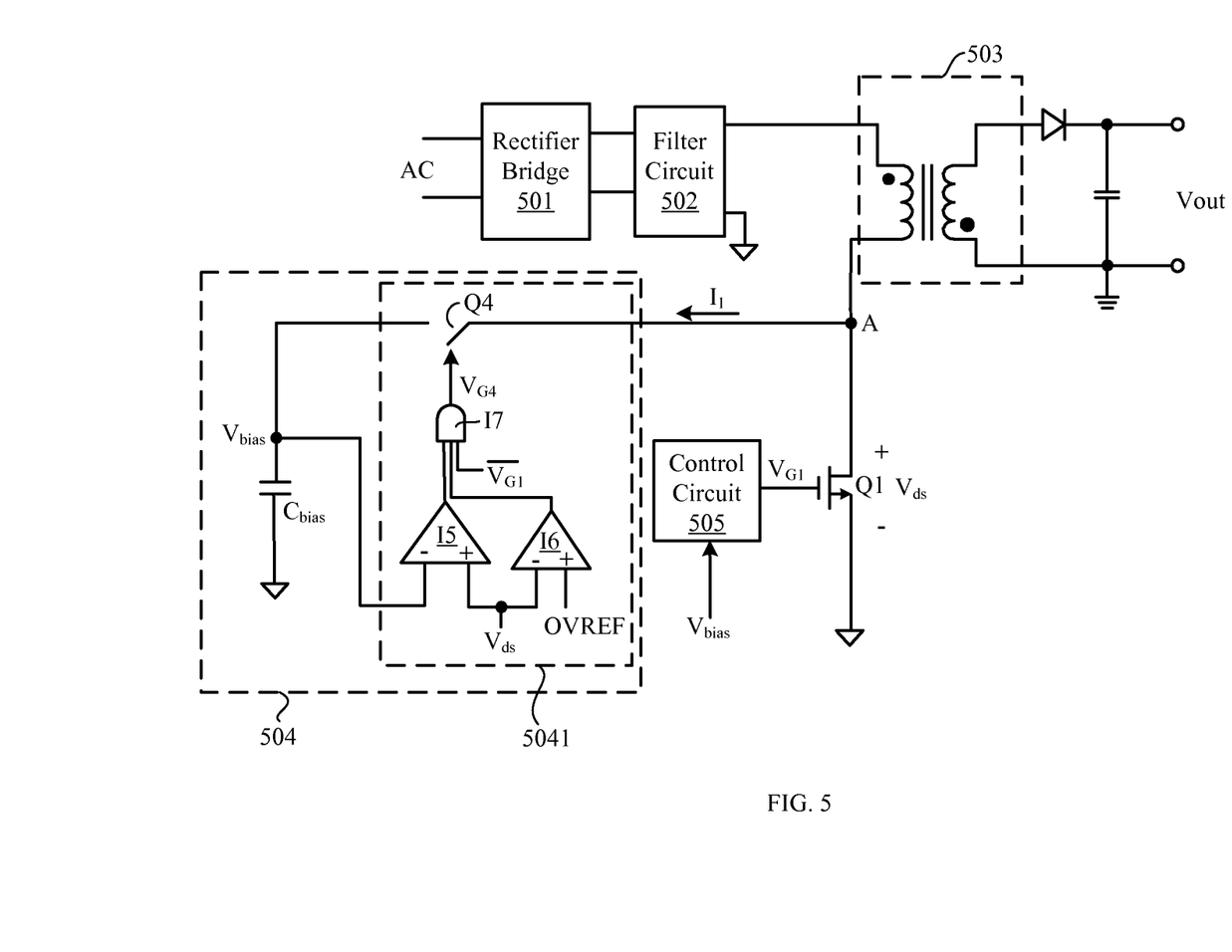
FIG. 5 shows a schematic block diagram of a fourth example bias voltage generating circuit in accordance with embodiments of the present invention.

Referring now to FIG. 5, shown is a schematic block diagram of a switching power supply including a bias voltage generating circuit, in accordance with embodiments of the present invention. In this particular example, a power stage circuit can include a single-stage flyback transformer circuit; however, other power stage circuit configurations can also be utilized in certain embodiments. In this example, the switching power supply can include rectifier bridge 501, filter circuit 502, transformer 503, control circuit 505 and switch Q1. Bias voltage generating circuit 504 can include control circuit 5041, and capacitor $C_{bias}$.

In order to further improve efficiency and reduce losses, the control circuit in this particular example can control a capacitor to operate in a charging state when a drain-source voltage of a switch (e.g., Q1) is greater than a voltage across the capacitor $C_{bias}$, but also less than a voltage level of overvoltage protection voltage OVREF. Control circuit 5041 in this example can include comparator I5, comparator I6, AND-gate I7, and switch Q4. An inverting input terminal of comparator I6 in this example can receive drain-source voltage $V_{ds}$ of switch Q1. A non-inverting input terminal of comparator I6 can receive overvoltage protection voltage OVREF. AND-gate I7 can receive output signals of comparators I5 and I6, and an inverted version of control signal $V_{G1}$ of switch Q1. AND-gate I7 can generate control signal $V_{G4}$ that can be provided to the control terminal of switch Q4.

Figure 6:
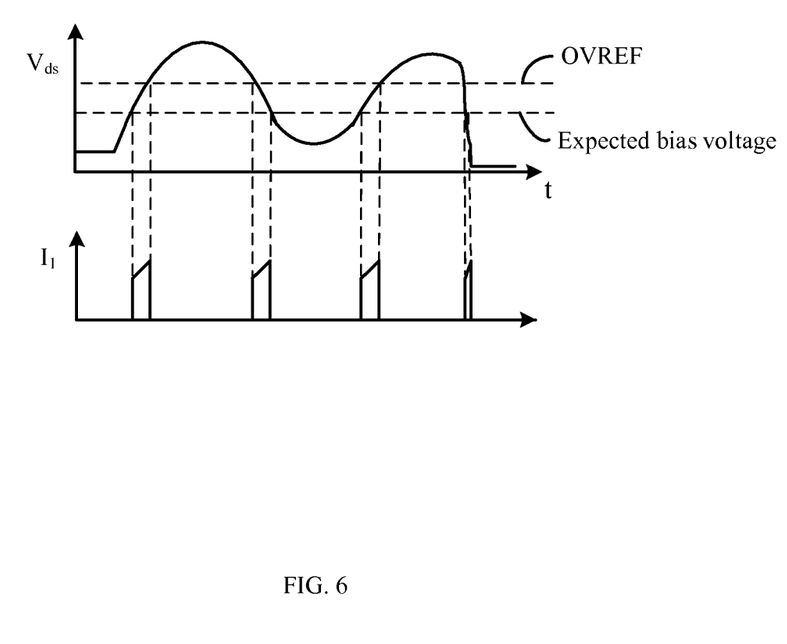
FIG. 6 shows an operating waveform diagram of the bias voltage generating circuit of FIG. 5, in accordance with embodiments of the present invention.

Referring now to FIG. 6, shown is an example operation waveform diagram of a bias voltage generating circuit, in accordance with embodiments of the present invention. Example operation of the bias voltage generating circuit of FIG. 5 will now be described. Initially, control circuit 505 may not be operating or may otherwise be disabled (e.g., when $V_{bias}$ is less than the expected bias voltage), switch Q1 may be off, and control signal $V_{GS}$ may be high. In accordance with the variation curve of $V_{ds}$, drain-source voltage $V_{ds}$ of switch Q1 may gradually increase. When drain-source voltage $V_{ds}$ of switch Q1 reaches a level of bias voltage $V_{bias}$, comparator I5 can output a high level signal to AND-gate I7. When drain-source voltage $V_{ds}$ is less than overvoltage protection voltage OVREF, comparator I6 can output a high level signal.

Therefore, when $V_{bias}<V_{ds}<$OVREF, the output signal of AND-gate I7 (e.g., control signal $V_{G4}$) may be high, and switch Q4 can be turned on. Then, current $I_1$ from the power stage circuit may charge capacitor $C_{bias}$ through switch Q4. As a result, bias voltage $V_{bias}$ may gradually increase. Thereafter, along with drain-source voltage $V_{ds}$ of switch Q1 gradually increasing, when drain-source voltage $V_{ds}$ is greater than overvoltage protection voltage OVREF, comparator I6 can output a low level signal. Thus, control signal $V_{G4}$ from AND-gate I7 may go low, and switch Q4 can be turned off, resulting in capacitor $C_{bias}$ no longer charging.

Along with the variation of $V_{ds}$ (similar to a sine-wave), when drain-source voltage $V_{ds}$ becomes greater than bias voltage $V_{bias}$, yet smaller than overvoltage protection voltage OVREF, control signal $V_{G4}$ may go high such that switch Q4 may be turned on again. By repeating this process, control circuit 505 may not begin to operate or be enabled until bias voltage $V_{bias}$ of capacitor $C_{bias}$ is charged up enough to power control circuit 505. For example, control circuit 505 may operate or be enabled when bias voltage $V_{bias}$ reaches the expected bias voltage (e.g., a predetermined threshold value).

When drain-source voltage $V_{ds}$ becomes greater than bias voltage $V_{bias}$, yet less than overvoltage protection voltage OVREF, switch Q4 can be turned on. Therefore, on time of switch Q4 can be relatively short, and power losses through switch Q4 can be relatively low, and even negligible in some cases. As a result, the power conversion efficiency of this particular example can be improved relative to other approaches. Also, in the example of FIG. 5, because bias voltage $V_{bias}$ may be less than overvoltage protection voltage OVREF, overvoltage protection can be provided in order to prevent circuit damage possibly being caused by excessive charging of capacitor $C_{bias}$. For example, bias voltage $V_{bias}$ may not substantially exceed the expected bias voltage of control circuit 505. Rather, $V_{bias}$ may effectively be held to no greater than the OVREF level, e.g., in a range of from about 0% to about 20% greater than the expected bias voltage.

Particular embodiments may also include a switching power supply, which can include any one of the bias voltage generating circuits in the above examples, along with a power stage circuit, and a control circuit. The bias voltage generating circuit can be coupled to the power stage circuit, and may generate a bias voltage for the control circuit. After receiving a sufficient bias voltage, the control circuit may begin operation, the switching power supply can output a DC signal for loads by controlling switching operations of a power switch in the power stage circuit.

It should be noted that the various bias voltage generating circuits described herein can be utilised in any suitable switching power supply. For example, the power stage circuit can be configured as a forward converter, a buck topology circuit, a flyback converter, a boost topology circuit, and/or a buck-boost topology circuit. Thus, any power stage circuit realized by connecting a magnetic component with a power switch can be employed in particular embodiments.

A bias voltage generating circuit in particular embodiments can effectively power a control circuit with a relatively simple circuit structure, relatively costs, and relatively high conversion efficiency. In particular embodiments, a bias voltage generating circuit can control the charging of a capacitor by comparing a drain-source voltage of a switch against a voltage across a bias capacitor, so as to obtain a bias voltage for a control circuit. In addition, an overvoltage protection generating circuit can be used to provide overvoltage protection in order to prevent possible circuit damage due to excessive charging of the bias capacitor.

The embodiments were chosen and described in order to best explain the principles of the invention and its practical applications, to thereby enable others skilled in the art to best utilise the invention and various embodiments with modifications as are suited to the particular use contemplated. It is intended that the scope of the invention be defined by the claims appended hereto and their equivalents.

What is claimed is:

1. A bias voltage generating circuit, comprising:
   a) a first control circuit configured to compare a drain-source voltage of a first switch against a bias voltage across a capacitor;
   c) a second control circuit configured to control said first switch, wherein said second control circuit is configured to be enabled when said bias voltage is at least as high as an expected bias voltage;
   d) wherein said first control circuit is configured to control said first capacitor to charge when said drain-source voltage of said first switch is greater than said bias voltage, said first control circuit comprising: (i) a first comparator configured to receive said bias voltage and said drain-source voltage of said first switch, (ii) a second comparator configured to receive said bias voltage and an overvoltage protection voltage, (iii) an AND-gate configured to receive an output of said first comparator, an output of said second comparator, and an inverted control signal of said first switch, said AND-gate being configured to output a second control signal, and (iv) a second switch having a control terminal coupled to said second control signal, a first terminal coupled to a power terminal of said first switch, and a second terminal coupled to said capacitor; and
   e) wherein said bias voltage is less than said overvoltage protection voltage when said capacitor charges, and wherein said overvoltage protection voltage comprises a voltage that is a predetermined amount higher than said expected bias voltage.

2. The bias voltage generating circuit of claim 1, wherein said first switch is configured for a power stage circuit in a switching power supply.

3. A switching power supply, comprising:
   a) said bias voltage generating circuit of claim 1;
   b) a power stage circuit coupled to said bias voltage generating circuit, wherein said bias voltage generating circuit is configured to generate said bias voltage; and c) wherein said second control circuit is configured to receive said bias voltage, and to regulate said switching power supply to output a DC signal for a load by controlling a switching operation of said first switch.

4. The switching power supply of claim 3, wherein said power stage circuit is configured as at least one of: a forward converter, a flyback converter, a buck topology circuit, a boost topology circuit, and a buck-boost topology circuit.

* * * * *